(12) United States Patent
Hunter et al.

(10) Patent No.: US 7,221,380 B2
(45) Date of Patent: May 22, 2007

(54) INTEGRATED OBJECT BEND, SQUASH AND STRETCH METHOD AND APPARATUS

(75) Inventors: Steven Clay Hunter, San Francisco, CA (US); David H. Mullins, II, Kensington, CA (US); Robert H. Russ, Richmond, CA (US); William A. Wise, Oakland, CA (US); William F. Sheffler, Oakland, CA (US); Christian D. Hoffman, Oakland, CA (US)

(73) Assignee: Pixar, Emeryville, CA (US)

( * ) Notice: Subject to any disclaimer, the term of this patent is extended or adjusted under 35 U.S.C. 154(b) by 166 days.

(21) Appl. No.: 10/841,804

(22) Filed: May 6, 2004

(65) Prior Publication Data

US 2005/0030310 A1    Feb. 10, 2005

Related U.S. Application Data

(63) Continuation of application No. 10/766,515, filed on Jan. 27, 2004.

(60) Provisional application No. 60/470,931, filed on May 14, 2003.

(51) Int. Cl.
*G09G 5/00* (2006.01)
*G06T 15/70* (2006.01)

(52) U.S. Cl. .................. 345/648; 345/664; 345/473

(58) Field of Classification Search ............ 345/648, 345/664, 473
See application file for complete search history.

(56) References Cited

U.S. PATENT DOCUMENTS 5,731,819 A * 3/1998 Gagne et al. ............... 345/647

6,448,964 B1    9/2002 Isaacs et al.
6,593,927 B2 *  7/2003 Horowitz et al. ........... 345/473
2004/0085311 A1 * 5/2004 Lee et al. .................... 345/419

OTHER PUBLICATIONS

Chenney et al., "Stimulating Cartoon Style Animation," Proceedings of the 2nd International Symposium on Non-Photorealistic Animation and Rendering Session, 2002, pp. 133-138.
Weiley et al., "3D in Movies: How It Works", Jan. 7, 2001, retrieved from the Internet: <<http://webarchive.org/20010107183000/http://www.helio.com.au/features/how3dworks.html, retrieved on May 20, 2005, 6 pages total.

* cited by examiner

*Primary Examiner*—Kee M. Tung
*Assistant Examiner*—Michelle K. Lay
(74) *Attorney, Agent, or Firm*—Townsend and Townsend and Crew LLP

(57) ABSTRACT

A graphical user interface for a computer system includes a display portion configured to display a representation of a first three-dimensional object, wherein the first three-dimensional object has an associated first volume, and a control icon associated with the first three-dimensional object, wherein the control icon is configured to allow a user to specify a bend amount to the first three-dimensional object in a first dimension, wherein the display portion is also configured to display a representation of a bent first three-dimensional object, wherein the bent first three-dimensional object comprises the first three-dimensional object that is bent lengthwise in response to the bend amount, and that may have an adjusted thickness in response to the bend amount.

23 Claims, 12 Drawing Sheets

ARM AT REST WITH THE SQUASH AND STRETCH WIDGET DISPLAYED. ANIMATOR GRABS THE CUBE MANIPULATOR AND DRAGS IT TO LENGTHEN OR SHORTEN ARM AND / OR TO BEND ARM

ARM IN REST POSITION

ARM DEFORMED NEGATIVELY USING SIX INDIVIDUAL SCALE
CONTROLS. NOTE THAT USING THE SINGLE CONTROLS
CAUSES LOSS OF VOLUME IN THE ARM AT THE ELBOW.

ARM DEFORMED POSITIVELY USING SIX INDIVIDUAL
SCALE CONTROLS. NOTE THAT USING THE SINGLE
CONTROLS CAUSE LOSS OF VOLUME IN THE ARM,
UNDESIRED BULGING AT THE ELBOW.

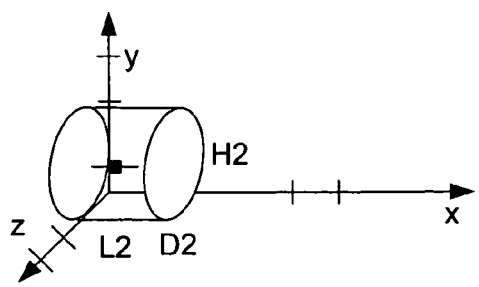
FIG. 5C
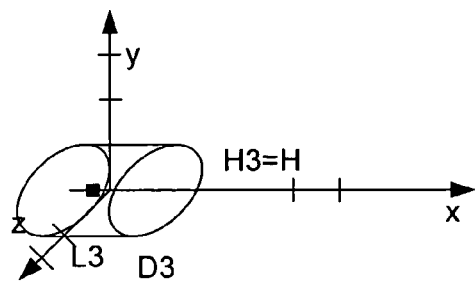
FIG. 5D
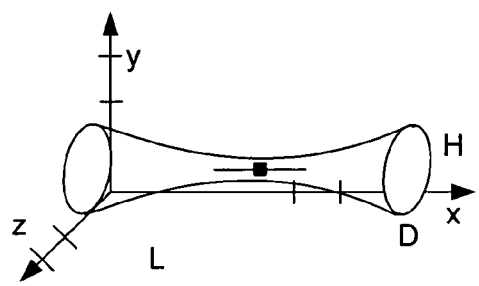
FIG. 5E
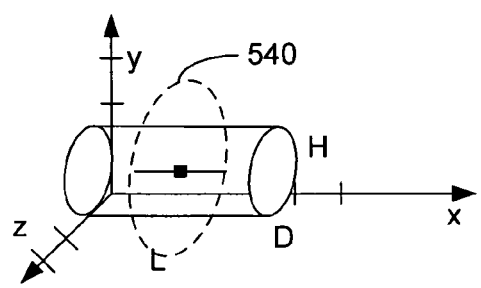
FIG. 5F
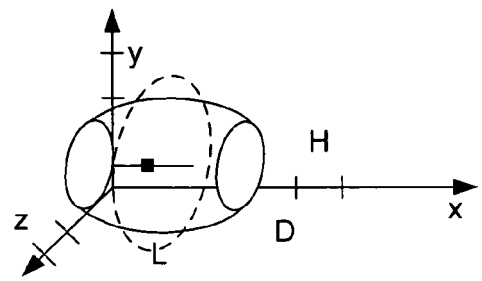
FIG. 5G1

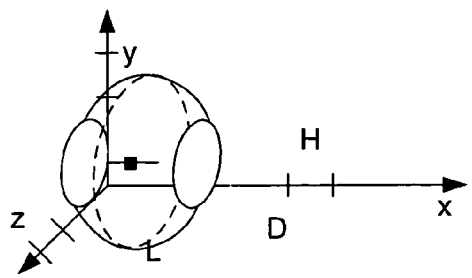
FIG. 5G2
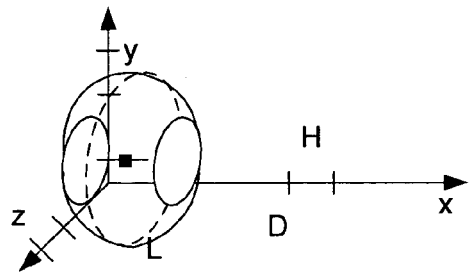
FIG. 5G3
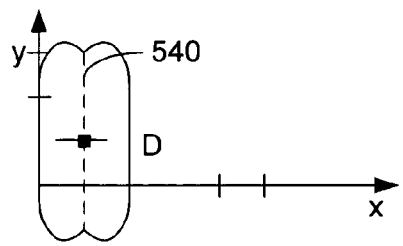
FIG. 5G4
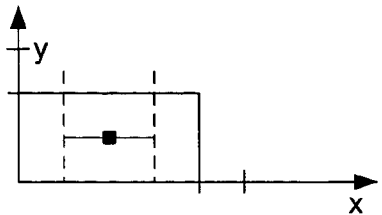
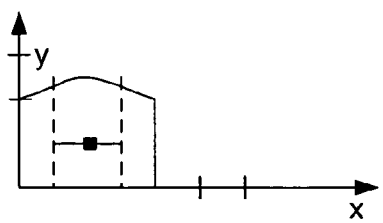
FIG. 5H
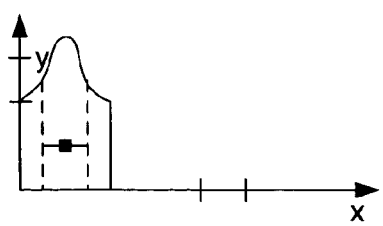

ARM AT REST WITH THE SQUASH AND STRETCH WIDGET DISPLAYED.
ANIMATOR GRABS THE CUBE MANIPULATOR AND DRAGS IT TO
LENGTHEN OR SHORTEN ARM AND / OR TO BEND ARM

FIG. 9A

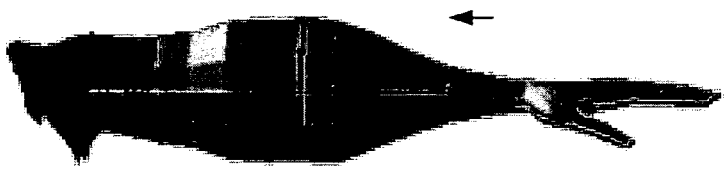

ARM DEFORMED WITH
SQUASH WIDGET IN THE
DIRECTION SHOWN

FIG. 9B

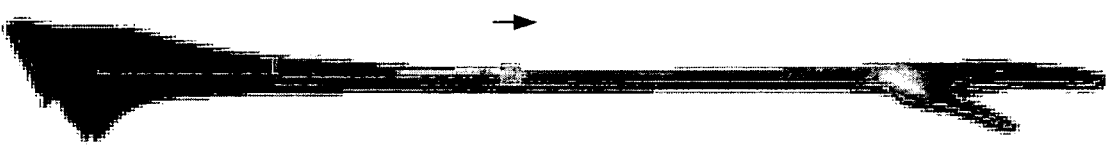

ARM DEFORMED WITH STRETCH OPERATION
IN THE DIRECTION SHOWN

FIG. 9C

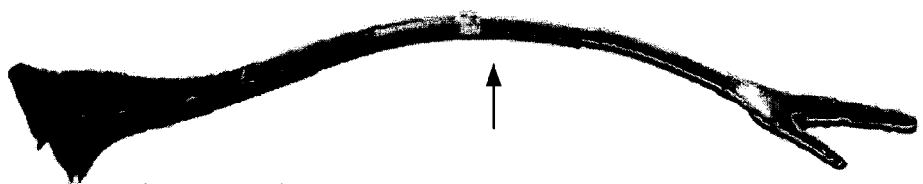

ARM DEFORMED WITH BEND OPERATION IN
DIRECTION SHOWN, WITH VOLUME PRESERVATION

FIG. 9D

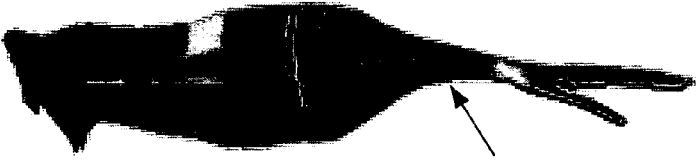

ARM DEFORMED WITH BEND OPERATION, SQUASH AND STRETCH
OPERATION IN THE DIRECTION SHOWN, WITH VOLUME PRESERVATION

FIG. 9E

INTEGRATED OBJECT BEND, SQUASH AND STRETCH METHOD AND APPARATUS

BACKGROUND OF THE INVENTION

CROSS-REFERENCES TO RELATED APPLICATIONS

The present invention is related to and incorporates by reference for all purposes provisional application No. 60/470,931 filed May 14, 2003 and U.S. patent application Ser. No. 10/766,515 filed Jan. 27, 2004.

BACKGROUND OF THE INVENTION

The present invention relates to computer animation. More specifically, the present invention relates to object manipulation, and in particular object squash and stretch methods and apparatus when bending objects.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer aided animation (CAA) industry was Pixar. Pixar developed both computing platforms specially designed for CAA, animation software, and rendering software now known as RenderMan®. RenderMan® was particularly well received in the animation industry and recognized with two Academy Awards®. While RenderMan® was focused upon rendering, the creation of images from geometric models, the animation software developed for in-house use focused upon allowing animators to specify ("animate") the geometric models. The geometric models typically represent objects in a scene, characters in a scene, positions of objects and characters, manipulation of objects and characters, lighting, textures, and the like.

Techniques for object manipulation known in the industry as "squash and stretch," was first described by Walt Disney animators in the 1930s. These techniques were attempts to allow animators to deform an object in motion to attempt to mimic "natural" changes of an object as it progressed "through an action." Attempting to maintain the volume of an object while in motion enables animators to convey the pliable nature of the object.

In the field of 3D animation, presently available animation tools have been better suited to working with solid objects like cars and teapots as they produces rigid looking volumes in motion. Typically, squash and stretch techniques were not needed for solid or rigid objects.

Prior to the present invention animators would have access to separate and very specific controls that could be individually operated on to deform an object. For example, animating an arm, in the forearm you would have three separate "scale" controls to change the shape: length, width and thickness. The animators would also have the same controls in the forearm. The animator would then have to control the relationships between those six controls to try and achieve the function of the squashing and stretching. For example, to stretch the arm, some of the controls would be set in the positive direction, some of the controls would be set in the negative direction and the animator would be responsible for sorting out which direction each control should be set. Unfortunately, the six controls treat the arm as two separate pieces and the resulting shape is highly undesirable.

FIGS. 1A–C illustrate inferior results of manual prior art techniques. More specifically, FIG. 1A illustrates an example of an arm having an upper portion, and a lower portion in a rest position. FIG. 1B illustrates the arm that has been squashed using non-integrated object squash and stretch operations, such as scale. As can be seen in FIG. 1B, one problem with traditional techniques is that the elbow volume is not properly maintained. FIG. 1C illustrates the arm that has been stretched using non-integrated object squash and stretch operations, such as scale. As can be seen in FIG. 1C, one problem with traditional techniques is that the elbow volume is improperly maintained.

Recently third party 3D animation packages like Alias/Wavefront's Maya have begun to support a customization of their controls that allows animators to write custom command code to "blend shapes." The inventors have considered that in light of the present disclosure, theoretically, using commercially available packages, they might be able to take an object and compensate for squash and stretch, however not without a lot of labor for preparing an object model, and writing custom code.

The inventors of the present invention have determined that methods for automated and integrated squashing and stretching of objects is needed in the context of 3D animation, without the drawbacks illustrated above.

SUMMARY OF THE INVENTION

The present invention relates to object manipulation. More specifically, the present invention relates to an integrated object squash and stretch method and apparatus. The present invention disclosure describes features from a Pixar brand squash and stretch software technique known as "Squetch." Further, the present invention disclosure describes squash and stretch software techniques applied when bending objects. These techniques are incorporated in a Pixar brand bend, squash and stretch software technique known as "Bendbow."

Embodiments of the integrated squash and stretch invention is a mechanical animation control that combines one, two, or more separate object volume preservation functions into a single operation in a computer-based animation program. The control is accessed by selecting a predefined mode and interacting with a graphical widget (e.g. icon) that provides direct manipulation of the shape of an object. The amount of volume preservation is an animatable control that increases or decreases. Pixar brand volume preservation amount is called "squamount."

In various embodiments, squamount is approximately the percentage of volume that is persevered, such that 0 is no volume preservation, or a scale while 1 is complete preservation. Alternatively, 1 can indicate volume preservation defined by the user. For example, 1 can indicate 75% volume of the original object, 120% volume of the original object, and the like.

The squash and stretch methods described herein are desired when working with fleshy objects such as humans. As an example, consider the change in the shape of a bicep when an arm bends. When the arm is contracted, the bicep bulges to reveal its mass, as opposed to when the arm is extended, the bicep elongates and conforms to the bone. However, the inventors have discovered that squash and stretch techniques are also useful for "rigid" items, such as staplers, cars, lamps, and the like.

These techniques are used frequently throughout an entire character to soften the hard mechanical feeling of motion traditionally present in 3D animation. Accordingly, squash and stretch controls can be found on a character's face, jaw, head, neck, chest, torso, body, arm, hand fingers, leg, foot, toe, etc. In addition to bringing a sense of flexibility to an organic object, integrated squash and stretch with volume preservation allows the animators to produce an effect to heighten emotion or to bring attention to something.

These techniques are also useful in situations where an object is not only simply being stretched or squashed directly along a first axis of the object, but also in cases where the stretching of squashing along the first axis of the object is a result of the object being bent or bowed.

An example of every-day squash and stretch and volume preservation, is when a rubber band is pulled apart with two fingers. In such a case, the length of the rubber band increases along its length (first axis) due to the movement of the two fingers along the length (i.e. apart). Further, in this case, because the volume of the rubber band is preserved, the rubber band gets thinner. An example of every-day squash and stretch applied to object bending, is when a rubber band is held apart with two fingers, and pulled down by a third finger. In such a case, the length of the rubber band increases along its length, in this case, due to the movement of the third finger in a direction different (e.g. perpendicular) from the length (first axis). Again, in this case, because the volume of the rubber band is preserved, the rubber band gets thinner.

According to one aspect of the invention, a method of object manipulation in a computer system is described. According to one aspect of the invention, a method of object manipulation in a computer system is disclosed. One technique includes displaying a representation of a first three-dimensional object on a display, wherein the first three-dimensional object has an associated first axis, a second axis, a third axis, and a first volume, and displaying a control indicator on the display, wherein the control indicator is associated with the first three-dimensional object. Various methods include receiving an offset in a direction along the second axis for the control indicator in response to user input with a user input device, and bending the first three-dimensional object in the direction along the second axis in response to the offset to form a bent first three-dimensional object, wherein the bent first three-dimensional object is associated with a second volume. The bending method also includes: modifying a length of the first three-dimensional object along the first axis in response to the offset, and modifying a width of the first three-dimensional object in the second axis in response to the offset. Various technique also include displaying a representation of the bent first three-dimensional object on the display.

According to another aspect of the invention, a computer program product for a computer system including a processor and a display is disclosed. Various embodiments includes code that directs the processor to display a representation of a first object on the display, wherein the first object has an associated first volume, and code that directs the processor to receive an indication of a bend value associated with the first object in a first dimension. Embodiments also include code that directs the processor to determine a first bent object that includes code that directs the processor to modify a shape of a spline associated with the first object in response to the bend value, and code that directs the processor to modify a thickness of the first object in response to the bend value. Additionally, code that directs the processor to display a representation of the first bent object on the display, wherein the first bent object has an associated second volume may also be included. The codes typically reside on a tangible media, such as a magnetic media, electronic media, film or paper media, or the like.

According to yet another aspect of the invention, a graphical user interface for a computer system is disclosed. Exemplary interfaces include a display portion configured to display a representation of a first three-dimensional object, wherein the first three-dimensional object has an associated first volume, and a control icon associated with the first three-dimensional object, wherein the control icon is configured to allow a user to specify a bend amount to the first three-dimensional object in a first dimension. In various systems, the display portion is also configured to display a representation of a bent first three-dimensional object, the bent first three-dimensional object comprises the first three-dimensional object that is bent lengthwise in response to the bend amount, and that has an adjusted thickness in response to the bend amount.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 5A–5H illustrate additional embodiments of the present invention;

FIGS. 9A–E illustrate examples of embodiments of the present invention.

DETAILED DESCRIPTION OF THE INVENTION

Figure 2:
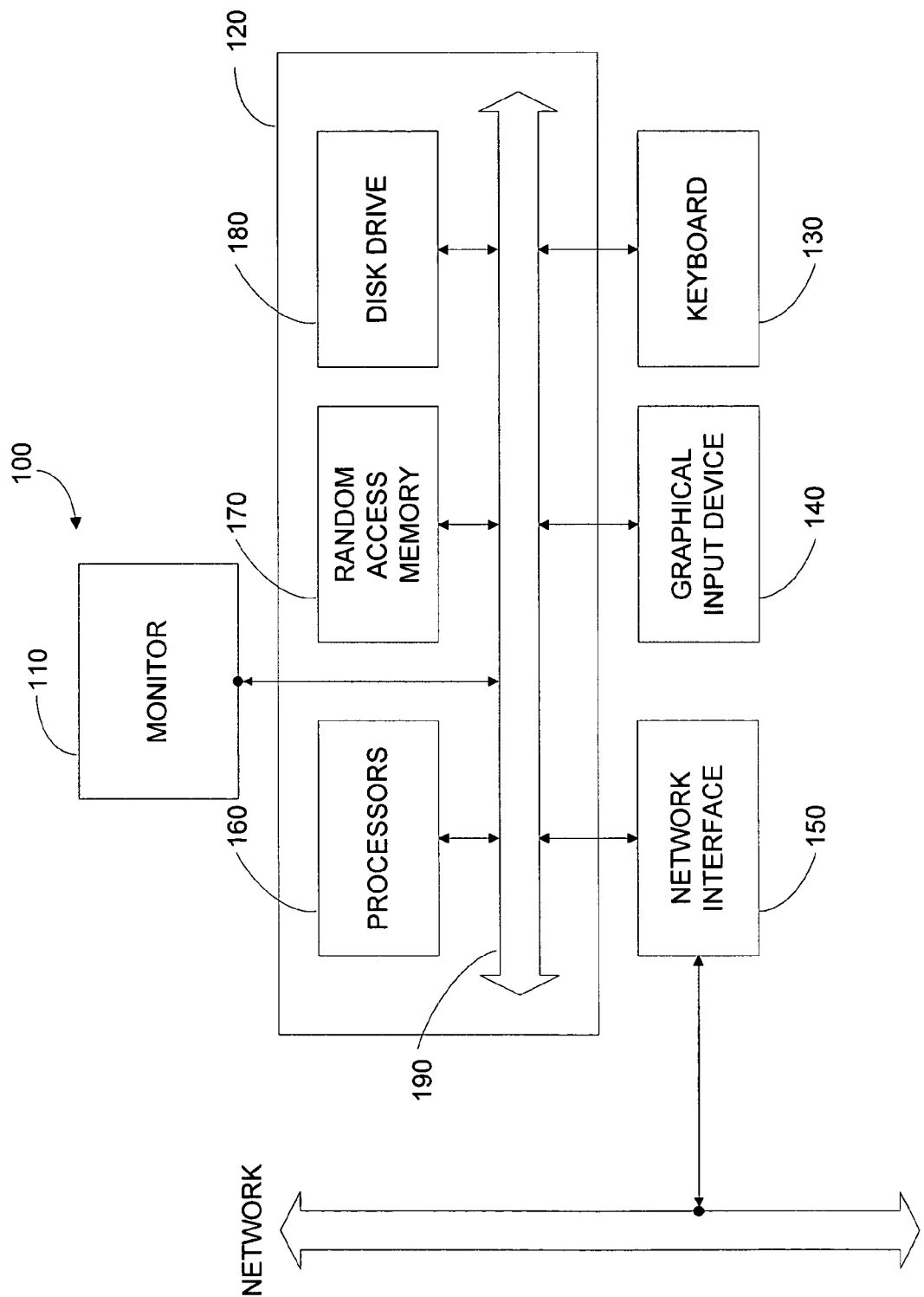
FIG. 2 illustrates a block diagram of an animation system according to one embodiment of the present invention.

FIG. 2 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, joystick, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having one or more microprocessors from Intel Corporation. Further, in the present embodiment, computer 120 may include a UNIX-based operating system, such as Linux.

RAM 170 and disk drive 180 are examples of tangible media for storage of data, audio/video files, computer programs, applet interpreters or compilers, virtual machines, embodiments of the herein described invention including an animation environment, animation engine, geometric description of objects, characters, object data files, character rigging, shader descriptors, a rendering engine, output image files, texture maps, displacement maps, scattering lengths and absorption data of object materials, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of computer animation systems capable of embodying the present invention. It will be readily apparent to one of ordinary skill in the art that many other hardware and software configurations are suitable for use with the present invention. For example, the use of other micro processors are contemplated, such as Pentium™, Xeon™, or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 3A:
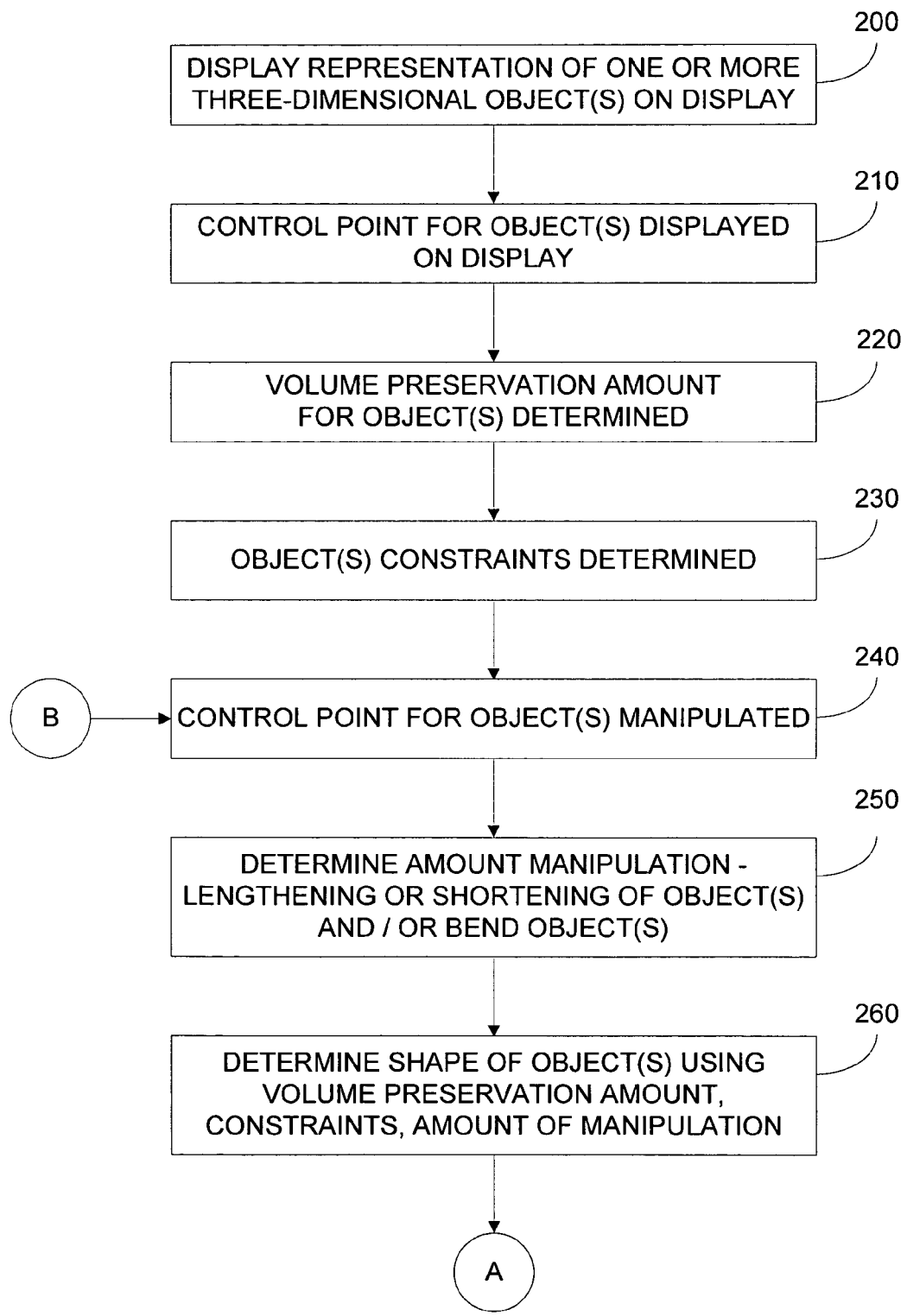
FIGS. 3A–B illustrate a block diagram of a process flow according to an embodiment of the present invention.
Figure 3B:
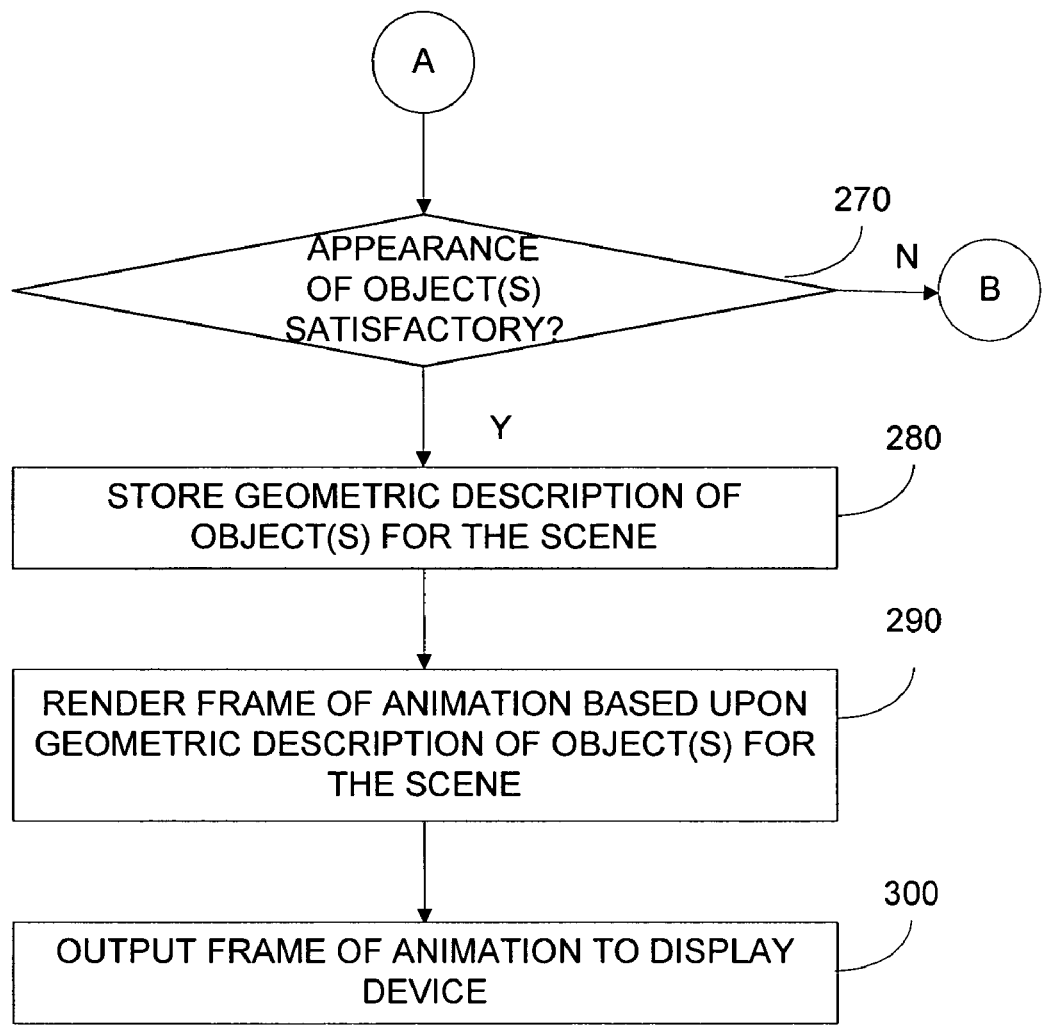

FIGS. 3A–B illustrate a block diagram of a process flow according to an embodiment of the present invention.

In the embodiment illustrated, initially a representation of one or more three-dimensional objects are displayed on a display and selected by the user, step 200. This may resemble a CAD-like, view of the geometric objects. Next, typically in response to a user selection, a control point associated with the objects are also displayed on the display, step 210. In embodiments of the present invention, the selection may be the user clicking directly on the objects on the display, may be in response to a user hitting a "hot key" on a keyboard, to a user selecting one or more icons or menu selections on the display, may be performed by the selection of one or more keys on a keyboard (e.g. picking objects automatically while traversing a defined model hierarchy via arrow keys, "pickwalking"), in any other conventional manner, or the like. This invokes the integrated squash and stretch command to be available for the group of selected objects.

In various embodiments, as will be discussed, when the control point is moved in the length-wise direction of the one or more three-dimensional object, squash and stretch operations are performed. Additionally, when the control point is moved in the width-wise or depth-wise (thickness) direction, bend, squash and stretch operations are performed.

In this embodiment, the user may input an amount of volume preservation desired for this process, step 220. In the present embodiment, the amount ranges from 0 (no volume preservation) to 1 (full volume preservation), however, in other embodiments, the amount may be negative, or represented by any other range of numbers, for example 0 to 100, or the like. Any conventional method for allowing a user to select the amount from the amount range can be used, for example, graphical slider, direct keyboard input, hot key input, graphical numeric pad, and the like. In other embodiments, the amount of volume preservation may be defined or pre-defined by another user, thus this step may be skipped. The Pixar brand term for an amount of volume preservation is known as "squamount".

In the process illustrated in FIG. 3A, constraints for the objects may be specified, step 230. Many different constraints on the objects can be specified, and some will be illustrated below. For example, objects may have a maximum size in the x, y, or z dimension; the objects may have cross-sections that have a maximum area, the objects may have portions that have different rates of expansion or contraction, the objects may have different volume preservation amount, the objects may have a specified profile or shape, and the like.

In the present embodiment, the user then selects and moves the control point on the display, step 240. In one embodiment, the control point is typically constrained to move in only one of the primary coordinate axis of the objects. For example, in an x, y, z coordinate system, the control point may be constrained to move in the +x and −x directions, +y and −y directions, etc; in a cylindrical coordinate system of the objects, the control point may be constrained to move in the +r and −r directions or the +z and −z directions. In these embodiments, squash and stretch operations without a bend operation, may be performed, and in other embodiments, squash and stretch operations as a result of a bend operation, may be performed. Maximum, and/or minimum constraints may be specified to limit the range of positions of movement of the control point.

In other embodiments of the present invention, the control point may move in more than one of the primary coordinate axes. For example, in an x, y, z coordinate system of an object, the control point can be moved within the x-y plane, the control point can be moved within the x-z plane, the control point can be moved within the y-z plane, or the like.

In embodiments of the present invention, squash and stretch operations without bend operations may occur when moving the control point in the longest direction (lengthwise direction). For example, the one or more objects are to be stretched or squashed in response to the movement of the control point in the x-direction. In other embodiments, squash and stretch operations without bend operations can occur when moving the control point in a "any specified direction, such as a "short" direction of the object (e.g. height-wise, depth-wise). As an example, the object may represent a piece of "goo" splattered on a floor, and the control is moved away from the floor, in a "short" direction of the goo. This movement of the control point may represent the goo object being picked-up. In such a case, the goo object will be stretched upwards.

In embodiments, bend operations are specified by moving the control point in the width and thickness direction of the one or more objects (e.g. y-direction, and/or z-direction). In such embodiments, the length of the object is typically modified by the bend operation. Accordingly, squash and stretch operations and volume preservation operations, can be applied to modify the width and thickness of the object.

In the present embodiments, an amount of shortening, or an amount of lengthening of the objects is determined in response to the movement of the control point, step 250. In other words, how much objects are squashed or stretched is determined, respectively. In systems where the movement of the control point is constrained to a single object coordinate axis (e.g. length-wise, depth-wise, height-wise), the squash or stretch of the object can be easily determined. In systems where the movement of the control point is constrained to move in the objects' coordinate plane (e.g. length-wise, width-wise, thickness-wise), the squash or stretch of the objects in the separate dimensions can be determined using standard calculations (e.g. trigonometric), or the like. In other embodiments, the user can specify the amount by direct keyboard entry, or the amount can be specified as dependent upon the size of the "opening" for the objects.

In the present example, dimensions for the objects and the final shape of the objects are then determined, step 260. In the various examples, the final shape is determined based upon the squash or stretch amount of the objects, upon the bend amount, and/or the amount of volume preservation specified, the constraints specified, and the like. As will be illustrated below, a great number of constraints may be defined that are used in determining the final shape of the objects after being squashed or stretched.

In embodiments where movement of the control point is not only length-wise, an amount of object bend is determined. This bend amount is used to modify one or more splines that define the shape of the one or more objects. In various embodiments, by bending an object, the length of the object typically increases. Based upon the increase in length and the volume preservation factor, the width and height of the object are also modified. For example, when there is full volume preservation, when an object is bent, the width and the height of the object will typically decrease to maintain the volume of the object. In another example, volume preservation is ignored, and the objects may be bent or unbent without considering the effect on volume of the object. In various embodiments, the three-dimensional object may be bent, via width-wise or thickness-wise movement, and may be directly squashed or stretched, via lengthwise movement, at the same time. Examples of this will be illustrated below.

The process repeats, until the user/animator, is satisfied with the bent, squashed or stretched shape of the objects, step 270. The shape data (geometric data) of the objects, orientation of the objects, etc. are typically stored for that frame of animation, step 280. Later, the geometric data is retrieved during a rendering process, and the objects are rendered and recorded within that frame of animation, step 290. The frame may be recorded onto film media, print media, magnetic media, optical media, or the like. Subsequently, the frame of animation can be retrieved from the media and output for viewing by the user/animator, by an audience, or the like, on a display such as a television, computer, theater screen, etc., step 300. Additionally, the frame of animation may be recorded onto a tangible media such as movie film, paper, plastic, metal, or the like, may be recorded in an appropriate form onto an optical media, magnetic media, solid state media, or the like. Additionally, the frame of animation may be transmitted across one or more computer networks in a packetized manner, or in other appropriate encoding format.

FIGS. 4A–G illustrate embodiments of the present invention. More specifically, FIGS. 4A–G illustrate a typical squash and stretch process that may or may not be combined with an object bend process.

Figure 4A:
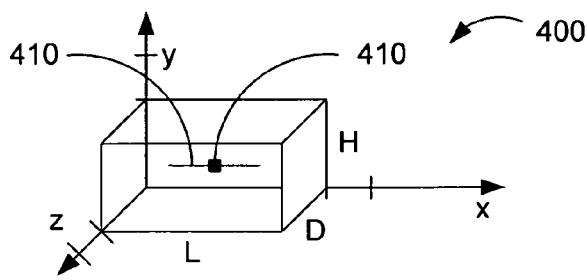
FIGS. 4A–G illustrate embodiments of the present invention.

FIG. 4A illustrates a typical display of simple object 400 having a length dimension L in the x direction, a height H in the y direction, and a depth D in the z direction. Also illustrated in FIG. 4A is a typical control icon/point 410, and a line 420.

In the present embodiment, line 420 is used to visually indicate to a user, the direction of stretch or squash allowed. As illustrated in this example, control point 410 is constrained to be moved in the x direction.

Figure 4B:
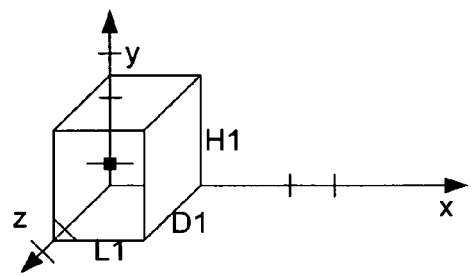

In the example in FIG. 4B, the volume preservation is set to 1. In this example, the user has selected the control point 410 and dragged it to the left, indicating that the length L of object 400 is to be shortened to length L1. In response, the computer system attempts to preserve the volume of object 400 and determines a larger depth D1 and a larger height H1 for object 400. In this case, where the volume preservation is set to one, the following relationship will approximately hold: $L*D*H = L1*D1*H1$.

Figure 4C:
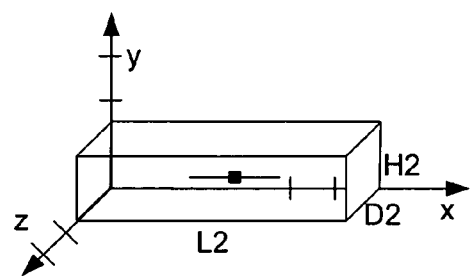

In the example in FIG. 4C, the volume preservation is again set to 1. In this example, the user has selected the control point 410 and dragged it to the right, indicating that the length L of object 400 is to be stretched to length L2. In response, the computer system attempts to preserve the volume of object 400 and determines a smaller depth D2 and smaller height H2 for object 400. In the present embodiment, the following equation can be used for determining the dimensions of the object:

$$L'*D'*H' = ((L-L')*V_p + L')*D*H$$

In this equation, L', D' and H' are the length, depth, and height of the squashed or stretched object(s), L, D and H are the length, depth, and height of the beginning object(s), and VP is the target or set volume preservation amount (e.g. 0 to 1).

In this case, where the volume preservation is set to one, the following relationship will approximately hold: $L2*D2*H2=L*D*H$.

Figure 4D:
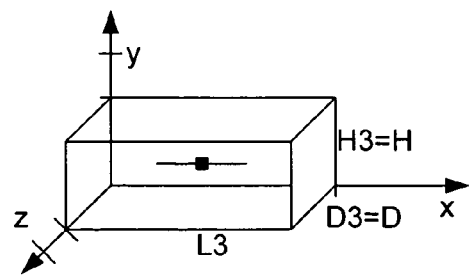
Figure 4E:
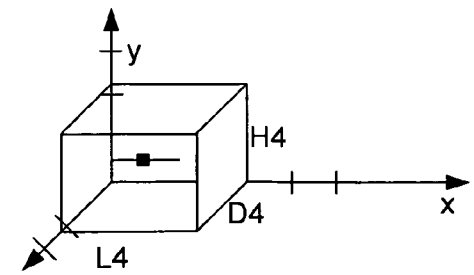

In the example in FIG. 4D, the volume preservation is set to 0. In this example, the user has selected the control point 410 and dragged it to the right, indicating that the length L of object 400 is to be stretched to length L3. In response, the computer system does not attempt to preserve the volume of object 400 and thus, the height H3 remains H and the depth D3 remains D for object 400. Accordingly the volume is $L'*D3*H3=L'*D*H$.

Figure 4F:
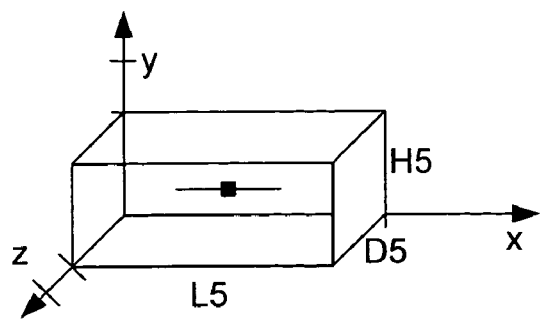

In the example in FIG. 4F, the volume preservation is set to 0.5. In this example, the user has selected the control point 410 and dragged it to the left, indicating that the length L of object 400 is to be shortened to length L4. In response, the computer system attempts to preserve some the volume of object 400 and thus, the height becomes H4 and the depth becomes D4 for object 400. Using the equation, above, where the volume preservation is set to 0.5, the following relationship will approximately hold: $L4*D4*H4=(L+L4)*D*H*0.5$.

In the example in FIG. 4F, in other embodiments, the volume preservation may be set to a negative number. In this example, the user has selected the control point 410 and dragged it to the right, indicating that the length L of object 400 is to be changed to length L5. In this example the volume preservation is set to −1. In response, the computer system increases the volume and thus, the height becomes H5 and the depth becomes D5 for object 400. In this case, $L5*D5*H5=(2*L5-L)*D*H$. As can be seen, when L5 is greater than L, the volume is greater than $L*D*H$, and when L5 is less than L, the volume is less than $L*D*H$.

In light of the present disclosure, one of ordinary skill in the art would understand that the volume preservation may be set to other values (e.g. >1), and the effects upon the volume can be readily determined. Further, in the above embodiments, the length of the object was increased or decreased, however, it should be understood that in other embodiments, the depth D, or height H could be directly manipulated instead of the length, or in addition to the length. Additionally, the simultaneous manipulation of combinations of depth and height, length and depth, height and length are also contemplated in other embodiments of the present invention. Additionally, as discussed above, the process may also be combined with an object bend process.

Figure 4G:
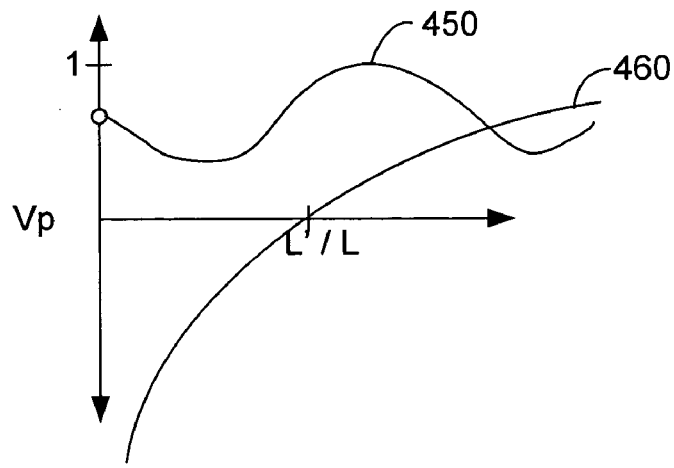

FIG. 4G illustrates relationships of various embodiment of the present invention. In embodiments of the present invention, the volume preservation Vp need not be constant, and may vary based upon the amount of change of the desired dimension. As is illustrated in FIG. 4G, any number of relationships can be used such as relationship 450, 460 and the like. The relationships may be based upon equation or manual selection. One effect that may be achieved by varying the volume preservation Vp is that as an object is stretched or squashed, the effect is "eased in" and "eased out" at the pre-determined limits to the squash or stretch.

In embodiments of the present invention, when one dimension of the object is lengthened or shortened, the remaining two dimensions of the object are shortened and/or lengthened. As discussed above, the remaining two dimensions of the object are adjusted to attempt to preserve volume, depending upon the volume preservation factor. In embodiments of the present invention, the system may use a "scale" command in the remaining two dimensions to increase or decrease the remaining two dimensions. Additionally, a "scale" command may also be used to increase or decrease the adjusted dimensions. For example, if the length of the object is increased to twice the length, the system may first perform a scale command on the object in the length dimension of 200%. Next, based upon full volume preservation, the system may determine that the cross-section of the object in the remaining two dimensions should also be halved. To do this, the system may perform a scale command on the object in the depth and height dimensions. In this example, the scale command would be approximately ~71% ($0.707=1/(2 \exp 0.5)$). This scale function may be applied to any of the embodiments contemplated.

Figure 5A:
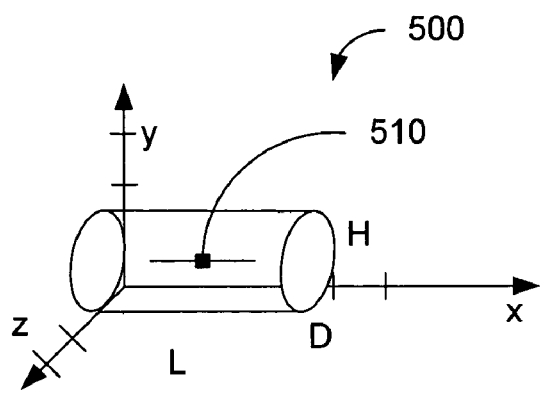

FIGS. 5A–5H illustrate additional embodiments of the present invention. In particular, FIG. 5A illustrates a cylinder 500 (a non rectilinear object) having a length L, height H, and depth D. A control point 510 is illustrated on cylinder 500. The embodiments illustrate the use of geometric constraints during squash and stretch operations. These embodiments may also be combined with an object bend operation.

Figure 5B:
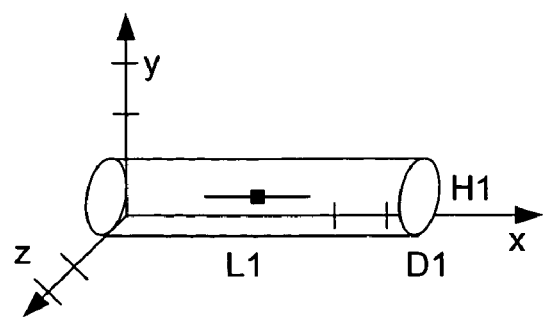

In the example in FIG. 5B, control point 510 is selected by the user and the length is increased. In this example, using a volume preservation factor from >0 to 1, as cylinder 500 is stretched to L1, the depth D1 and the height H1 decreases.

In the example in FIG. 5C, the user shortens the length of cylinder 500. Using the same parameters above, as can be seen cylinder 500 is shortened to L2, the depth D2 and height H2 increases.

In the example in FIG. 5D, the rates of change of cylinder 500 in the component directions can be different. Starting with the example in FIG. 5A, the user lengthens cylinder 500 to length L3. In this example, the height H is constrained to be constant or have a smaller rate of change compared to the depth D. Based upon the volume preservation factor, the height changes to H3 and the depth changes to D3. In this example, D3 is configured to increase or decrease faster than H3 in response to the shortening or lengthening of the length of the cylinder. For example, for L3>L, D3/D<H3/H; and for L3<L, D3/D>H3/H. In embodiments of the present invention, the rates of change may be constant or may change based upon a variety of factors, such as the length L3 compared to L, constraints to D, L, H, etc., or the like.

In the example in FIG. 5E, end portions 520 and 530 are constrained to be constant. In various embodiments, end portions 520 and 530 may be portions of cylinder 500 that are adjacent to other geometric objects. Because, the other geometric objects may not be subject to squash or stretch, the end portions should remain the same size.

Figure 1A:
FIGS. 1A–C illustrate results of manual prior art techniques.
Figure 1B:
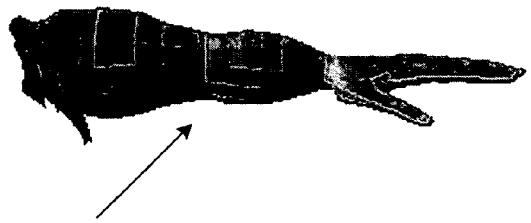
Figure 1C:
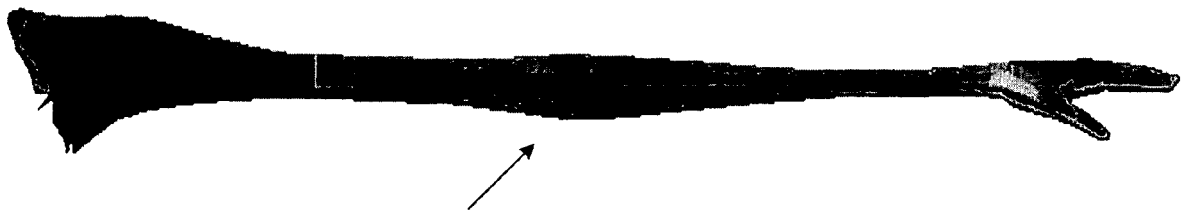

As illustrated in this embodiment, when cylinder 500 is stretched, and end portions 520 and 530 are constrained, the shape of cylinder 500 will bend inwards. Furthermore, when cylinder 500 is squashed, with the same constraints, as illustrated in FIGS. 5G1–5G3, the shape of cylinder 500 may bend outwards. In embodiments of the present invention, the shape of the surface may be specified, the curvature of the surface may be determined, or the like, using mathematical equation, by manual plot, by scale command, or the like. What is typically aesthetically pleasing is when the shape of cylinder 500 has a gradual change in curvature.

In the example in FIG. 5F, end portions 520 and 530 are constrained, and a constraint 540 is specified. In this embodiment, constraint 540 may represent the maximum desired size of cylinder 500 through the squash and stretch operations.

FIGS. 5G1–5G4 illustrate a sequence of figures where cylinder 500 is squashed. In FIG. 5G1, constraint 540 has not yet been met; in FIG. 5G2, the size of cylinder 500 reaches constraint 540; and in FIGS. 5G3 and 5G4, cylinder 500 is squashed further than in FIG. 5G2. In the embodiment illustrated in FIG. 5G3, as can be seen, further squashing cylinder 500, does not result in cylinder 500 exceeding constraint 540.

In the embodiment illustrated in FIG. 5G4, in cross-section, by further squashing cylinder 500, constraint 540 is met, but only where constraint 540 is located, and other portions of cylinder 500 "bulge out" further. In one embodiment, constraint 540 is cross-section or "cylinder" constraint.

In other embodiments of the present invention, more than one set of cross-section constraints may be set for an object. For example, cylinder 500 may have 10 or more constraints. As illustrated in FIG. 5H, constraints may be used to shape the "bulge out" profile of cylinder 500. In additional embodiments, the constraints may specify a maximum shape for a "bulge out" and/or a minimum shape for a "bulge in."

As illustrated in the embodiments herein, to preserve volume, volume calculations can be performed on the object. In the examples in FIG. 4, the volume equation is simple to calculate, however, in the examples in FIG. 5, the volume equations are much more complex. In light of the present patent disclosure, one of ordinary skill in the art will be able to determine the volumes illustrated herein based upon fundamental mathematical principles, such as volume integrals, or the like. As an object is lengthened or shortened, volume calculations, and determination of the shape and size of the object at different locations can be performed on the fly. In other embodiments, these values may be predetermined, to increase perceived user performance and responsiveness.

In some embodiments of the present invention, it is not necessary to have mathematically correct volume preservation. Instead, simple assumptions can be used to simplify the volume calculations. One possible simplification is with the use of bounding boxes around an object. For example, in the example in FIG. 5A, instead of determining the volume of cylinder 500 to be $L*\pi*r*r$, one can assume the volume calculation is $L*D*H$. This simplification would work well when using the "scale" function for the different dimensions, as discussed above. In still other embodiments, volume preservation is not mathematically calculated, but is estimated by viewing the effect of the squash or stretch operation upon the object.

Figure 6A:
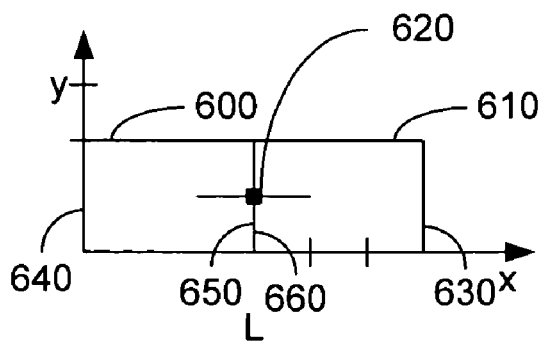
FIGS. 6A–6E illustrate additional embodiments of the present invention.

FIGS. 6A–6E illustrate additional embodiments of the present invention. In particular, FIG. 6A illustrates a first object 600 and second object 610, together having length L, height H, and depth D. A control point 620 is illustrated associated with both first object 600 and second object 610. The embodiments below illustrate squash and stretch operations based upon at least two objects. In such embodiments, a size constraint is set for end portions 630 and 640. Additionally, a constraint is for end portion 650 and end portion 660. A typical constraint is for the sizes and shapes of end portion 650 and end portion 660 to be equal. These embodiments may also be combined with an object bend operation.

Figure 6B:
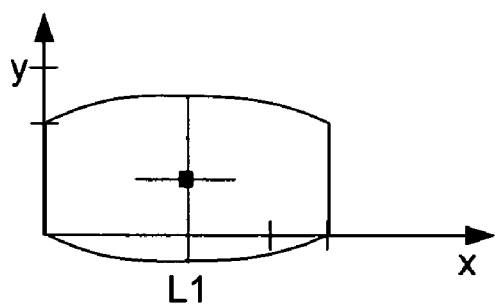
Figure 6C:
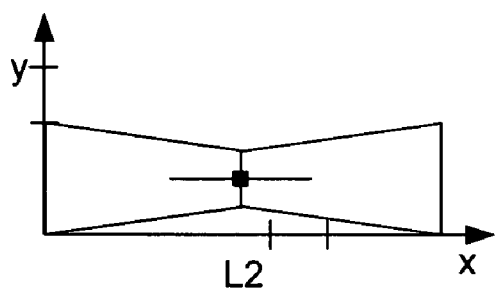

In the example in FIG. 6B, control point 620 is selected by the user for both objects 600 and 610 and the length of the combination is decreased. As can be seen, end portions 630 and 640 are constrained to be the same size, while the volume of both objects 600 and 610 are preserved. A similar result can be seen in the example in FIG. 6C, where the length of the combination is increased. As can be seen, end portions 630 and 640 are constrained to be the same size, while the volume of both objects 600 and 610 are preserved.

Figure 6D:
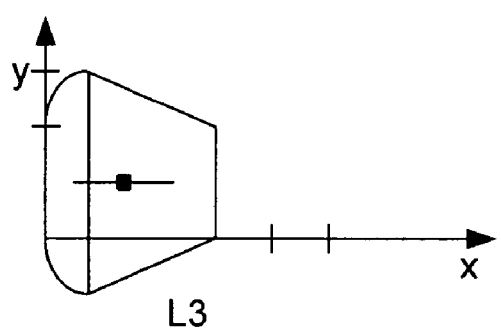
Figure 6E:
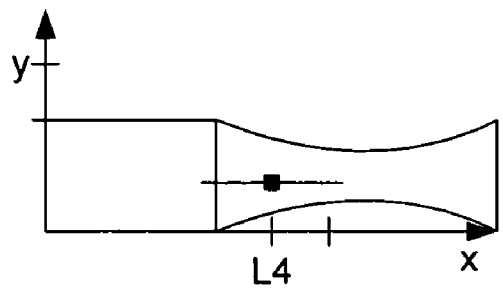

The examples in FIGS. 6D–6E, illustrate that the amount of lengthening or shortening of first object 600 relative to second object 610 can vary. For example, in response to a lengthen command, first object 600 may lengthened a smaller amount compared to second object 610, and in response to a shorten command, first object 600 may be shortened by a greater amount compared to second object 610. In the example in FIG. 6B, the system squashes first object 600 and second object 610 by an equal amount. However, as can be seen in FIG. 6D, the system can also squash first object 600 a greater amount than second object 610. Further, in the example in FIG. 6C, the system stretches first object 600 and second object 610 by an equal amount. However, as can be seen in FIG. 6D, the system can also stretch first object 610 a greater amount than second object 600. In these embodiments, the animator or other user may set-up parameters of these objects to stretch or squash at different relative rates.

In other embodiments of the present invention, any number of objects can be selected for a squash or stretch operation. For example, a single object, such as an eyeball can be squashed or stretched; and multiple objects, such as a complete character can be squashed or stretched. In light of the present disclosure, any number of constraints can be applied to different objects or different portions of an object. Further, the amount of volume preservation may be the same for all objects, for some of the objects, or different for all the objects. Still further, the shape of the objects after squash or stretch can also be constrained. Additionally, for different objects, the amount of squash or stretch relative to other objects may vary. For example, for a character face, when the head is compressed, the character's eyes may bulge out. As another example, for a character, if the torso is squashed, the belly of the character may bulge out, but the back and the sides of the character may stay the same, bulge out to a lesser degree, and the like.

In additional embodiments of the present invention, the control point may be located at any location on the object or set of objects, such as the middle, top, bottom, end point, or the like. As illustrated in some of the embodiments, the effect of movement of the control point may translate to a non-symmetric volume preservation effect on the object. As an example, the control point may be located at one-third the length of an object, then as the control point is moved and the object is squashed, the one-third portion of the object is squashed more than the remaining two-thirds portion of the object. When the object is stretched in length, the one-third portion of the object may stretch less than the two-thirds portion of the object. The difference in squash or stretch may be an absolute difference, a percentage difference, or the like.

In various embodiments of the present invention, a user may define where the control point is on the object(s). The placement of the control on the object(s) at different locations may provide the user with the non-symmetric squash and stretch effects, described above in some embodiments. Additionally, in various embodiments, the control point may be moved in any of the three coordinate directions, such as x, y, and z. For example, for a oval cylinder, if the control point is moved parallel to the z-axis of the cylinder, the cylinder lengthens or shortens, and depending upon the squamount, the x and y size of the oval cylinder may be squashed and/or stretched. As another example, if the control point is moved in the x direction, the y size may move sympathetically, and/or the z length of the oval cylinder may also vary.

In other embodiments of the present invention, movement of the control point may translate to a simultaneous stretch and squash in the same direction. For example, a control point may be located at one-third the length of an object, then as the control point is moved in one direction, one-third of an object may squash, and two-thirds of an object may stretch, and when the control point is moved in the complementary direction, one-third of the object may stretch while the two-thirds portion of the object may be squashed. As described in the various embodiments above, volume preservation factors may be used to determine how the object(s) squash and stretch.

Embodiments of the present invention provide an integrated squash and stretch command for an animator that preserves volume. With these embodiments, animators have a specialized mode built into the character rig. This specialized squash and stretch mode may be included into a list of controls that are delivered as standard with the character model.

FIGS. 7A–F illustrate additional examples of embodiments of the present invention. In particular, FIGS. 7A–F illustrate examples of bending, squashing and stretching.

Figure 7A:
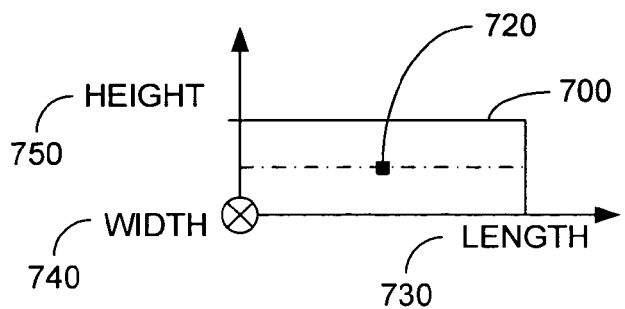
FIGS. 7A–G illustrate additional embodiments of the present invention.

FIG. 7A illustrates an object 700 and a control point 720. Object 700 includes a length-wise direction 730, and a width-wise (thickness, depth) direction 740, and a height-wise direction 750. In this example, object 700 may have any cross-section shape, such as a rectangle, square, circle, or the like.

Figure 7B:
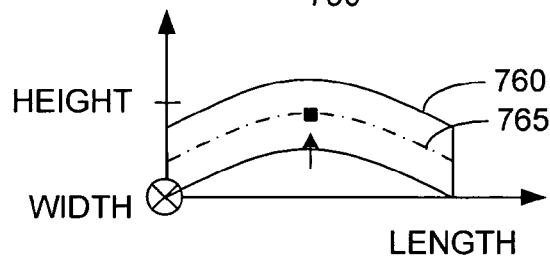

In the example of FIG. 7B, object 700 is manipulated with the volume preservation factor equal to 1. As shown, control point 720 is moved in only the height-wise direction 750, as shown, thus object 700 becomes bent into object 760. In this example, the length of object 760 along the object first axis 765 is greater than the length of object 700. Further, because the volume of the object is preserved, in this example, the width and height of object 760 are decreased compared to the width and height of object 700.

Figure 7C:
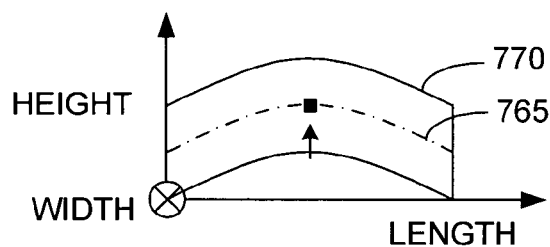

In the example of FIG. 7C, object 700 is manipulated with the volume preservation factor equal to 0, i.e. no volume preservation. In response to the same movement of control point 720, the length of object 770 along object first axis 765 is greater than the length of object 700, but the width and height of object 770 remains the same as object 700. In other embodiments, the width and height of object 770 may vary, but the volume is still preserved according to the volume preservation factor.

Figure 7D:
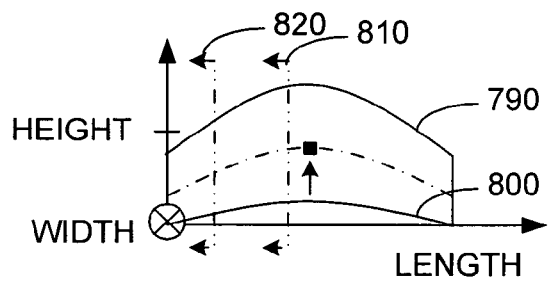

FIG. 7D illustrates another example of the present invention. In this example, in response to movement of control point 720, object 780 is formed taking into account the volume preservation factor. The example in FIG. 7D illustrates that the profile of the top surface 790 and the profile of the bottom surface 800 need not vary by the same amount. Instead, the user may specify the rate of change of the profile of top surface 790 and the rate of change of the profile of bottom surface 800 in response to the movement of control point 720. Typically, the profiles may be defined by one or more splines. For example, the user may specify that the spline associated with top surface 790 moves at a rate of 1.5 times the movement of control point 320, and that the spline associated with bottom surface 800 moves at a rate of 0.1 times the movement of control point 320. In the present example, in response to the movement of control point 320, the profile of top surface 790 bends more dramatically than the profile of bottom surface 800. As a result, the cross-section (width-height) area of object 700 varies length-wise. In this example, the area of cross-section 810 is larger than the area of cross-section 820.

Figure 7E:
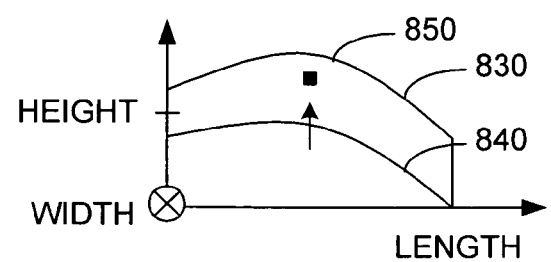

FIG. 7E illustrates another embodiment of the present invention. In this example, in response to movement of control point 720, the profile 830 the top surface and the profile 840 of the bottom surface of object 850 need not change uniformly over the length of object 850. In other embodiments of the present invention, constraints may be placed upon the profiles defining the bent object similar to constraints applied to squashed and stretch objects discussed in embodiments above.

Figure 7F:
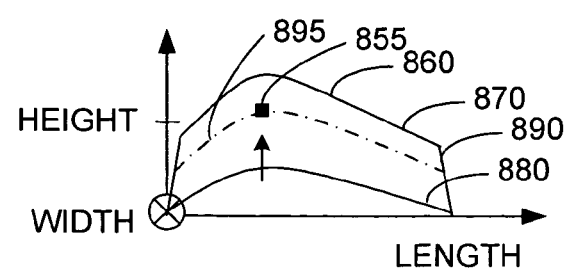
Figure 7G:
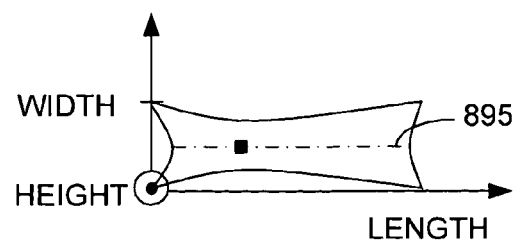

FIG. 7F illustrates another embodiment of the present invention. In this example, in response to movement of control point 855 that is off-center. As can be seen in this example, the top surface moves a greater amount compared to the bottom surface in response to the movement of control point 855. Accordingly, one way to preserve volume is to bend the sides (e.g. 890) of object 860 inwards, as shown. Other "solutions" for preserving volume are also contemplated, such as illustrated in FIG. 7G. For example, varying the length of object 860 along axis 895 as a function of width; varying the width of object 860 as a function of length along the axis 895, and the like. In other embodiments of the present invention, constraints may be placed upon the profiles defining the shape of the bent object similar to constraints discussed above.

In various embodiments, the control point may be predefined for the one or more objects at locations, such as the center of the group of objects, the control point may be freely selected by the user, or the like.

Figure 8A:
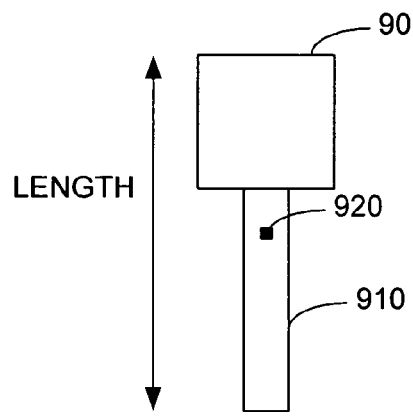
FIGS. 8A–C illustrate additional embodiments of the present invention.
Figure 8B:
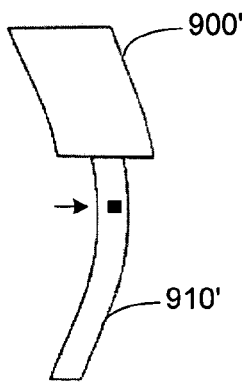
Figure 8C:
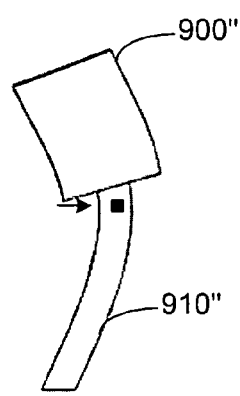

FIGS. 8A–C illustrate additional embodiments of the present invention. In particular, FIGS. 8A–C illustrates bend, squash and stretch applied to more than one object as a group. In FIG. 8A, a first object 900 and a second object 910 are grouped as one object, and a control point 920 is associated for the group.

One embodiment of the present invention is illustrated in FIG. 8B. In this example, control point 920 is moved in the height-width plane. As illustrated, both the first object 900' and the second object 910' bend uniformly, as though they were one object in this example. In this example, the volume is preserved by the narrowing of first object 900' and second object 910'.

Another embodiment of the present invention is illustrated in FIG. 8C. In this example, control point 920 is moved in the same manner as illustrated in FIG. 8B, however, as shown, the first object 900" and the second object 910" do not bend uniformly. In such embodiments, the user may specify an amount of effect a bend operation will have on an object, or a relative amount of bend of objects making up the group of objects will bend relative to each other. For example, for a pencil with an eraser, the eraser portion of the pencil will bend much more than the shaft of the pencil.

In the present embodiment, once the integrated squash and stretch controls is in the character rig, animators can simply engage the bend, squash and stretch mode by picking on an object part and switching from select mode to bend, squash and stretch mode. This results in a graphical representation, a widget to be displayed in a camera on the object part as illustrated in FIG. 9A. The widget has a single control that is drawn as small box attached to a line originating from the point from which the squash and stretch or bend will be manipulated. At this point the animator may elongate the widget by dragging the box, thus stretching the object. Conversely, by compressing the widget, the object is squashed. The widget may also be moved by arrow keys, or other keyboard input. In other embodiments, separate control widgets may be provided for the bend operation and for the squash and stretch operation.

In the present embodiment, the integrated bend, squash and stretch mode mimics volume preservation on a cube, such that when the cube is lengthen in one direction, the other two dimensions compensate to preserve volume for the entire object. As discussed above, the rate of change of the other two dimensions need not be equal.

In the present embodiment, referring to the arm example again, squash and stretch on the limb is really a combination of two squash and stretch controls, one on the upper arm and one on the lower arm. Each control is comprised of a translate control down the limb to lengthen or contract the limb, and two scales, one that controls the width and one that controls the depth. These two scales are used in the volume preservation. When squamount is set to 1, each of those controls fire to try and preserve volume to the default setting. When squamount is set to 0, these compensating scales have no effect at all and result in strictly a lengthening or contracting of the arm. For squamount values between 0 and 1, you get a blending between full volume preservation and no volume preservation.

Results of embodiments of the present invention are illustrated in FIGS. 9B and 9C. In particular, FIG. 9B illustrates a squash with preserved elbow volume, and FIG. 9C illustrates a stretch without elbow bulging. Further FIG. 9D illustrates a bend operation, and FIG. 9E illustrates a bend operation and a squash and stretch operation.

In other embodiments of the present invention, the translate control in the primary direction can be replaced with a scale control. This has been extremely useful when rigging a character's head because it is simpler to install. In the foregoing specification, the invention has been described with reference to specific exemplary embodiments thereof.

FIG. 9C illustrates the result of a bend function with volume preservation. As can be seen, as the length of the arm increases, the cross-sectional area decreases to preserve the volume.

FIG. 9D illustrates the result of a control point being moved length-wise to perform a squash and stretch operation, as well as the control point being moved in the height-width plane to bend the arm. In this example the resulting arm performs a stretch due to the length-wise movement, and a stretch due to the bend operation.

Many changes or modifications are readily envisioned. In light of the above disclosure, one of ordinary skill in the art would recognize that any number of combinations of constraints, rates of change, volume preservation amounts, and even ways for approximating volume calculations can be used in embodiments of the present invention.

In various embodiments, the rates of change of an object in component directions can be the same or different, the relative rates of change of objects being bent, squashed or stretch may be the same or different. In some embodiments, limits to a bend, stretch or squash can be introduced. Further, limits as to an increase or decrease in dimension for the object in other dimensions than the one being adjusted may also be used. The volume of objects can be mathematically correct or approximated using bounding boxes, or combinations of the above.

In light of the present disclosure, it is believed that one skilled in the art would be envision that objects can be bent or un-bent, squashed and/or stretched in any number of ways. In various embodiment multiple control points may be provided for an object, giving the user more than one bend point along the object, and/or one or more stretch and squash point along the object.

In actual use, the objects being bent, squashed or stretched may be a single three-dimensional object such as an eyeball, finger, nose, or the like, or groups of three-dimensional objects, such as objects making-up a head, a torso, feet, hands, wheels, or the like. Further, the teachings may also be applied in the area of two-dimensional objects. Accordingly, one would recognize that the integrated bend, squash and stretch functionality described is extremely powerful. The bend function and the squash and stretch functions may be implemented separately from one another with different manipulation control points ("widgets"). Alternatively, these manipulations may be integrated together in a single control point ,"widget," as illustrated in FIG. 9E. If separate, the volume preservation factors may be either similar or different, and the profile constraints may also be similar or different.

The embodiments described above can also be used in conjunction with other animation tools. One such tool includes an inverse kinematics solving tool, where squash and stretch with volume preservation functionality can be used when a constrained position for an object cannot be maintained. For example, when a foot of a character is constrained to be at a certain location, and other portions of the body have a specified position, the inverse kinematics solver may determine that the foot cannot be kept at that constrained position, for example, because the leg is not long enough. In such a case, automatic stretch and squash with volume preservation can be used on the leg so that the body and foot constraints can both be satisfied. Accordingly, the leg may be stretch in length, and the leg may or may not grow thinner. Conversely, depending upon the constraints, a leg may be squashed (shortened) in length, and the leg may or may not grow fatter. Other combinations of the techniques above with additional animation tools are also contemplated.

The objects that are modified according to the above software tools can subsequently be rendered using any conventional rendering package, such as RenderMan®, or the like. Further, the rendered images may be recorded onto a physical media such as optical media (e.g. DVD, CD-ROM), film, magnetic media (e.g. hard disk, video tape), or the like. A user may view the rendered images with a computer monitor, television, projection device, or other device.

In embodiments of the present invention, the bend, squash and stretch calculations and modifications to objects can be implemented by any conventional animation system, such as Pixar's Menv animation environment. By comparison, in the prior art, animators would have to manually "eye-ball" and adjust the object to bend, squash or stretch the object. Because the present system provides sophisticated an automated and integrated bend, squash and stretch functionality, the inventors believe that the bend, squash and stretch of objects performed by this system are much more consistent from frame to frame. Further, the inventors believe that the bend, squash and stretch of objects performed by this system provide a more accurate representation of real-world physics. Accordingly, the inventors believe that frames of animation including objects bent, squashed and stretched by the present system will be noticeably more realistic that was previously obtainable.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. For example, the volume preservation amount may not be specified by the animator/user but by another user such as a "rigger."

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of object manipulation in a computer system comprises:
   displaying a representation of a first three-dimensional object on a display, wherein the first three-dimensional object has an associated first axis, a second axis, a third axis, and a first volume, and wherein the first three-dimensional object has an associated initial first profile, and an associated initial second profile;
   displaying a control indicator on the display, wherein the control indicator is associated with the first three-dimensional object;
   receiving an offset in a direction along the second axis for the control indicator in response to user input with a user input device;
   bending the first three-dimensional object in the direction along the second axis in response to the offset to form a bent first three-dimensional object, wherein the bent first three-dimensional object is associated with a second volume, wherein the bent first three-dimensional object has an associated bent first profile, and an associated bent second profile, and wherein bending also includes:
      modifying a length of the first three-dimensional object along the first axis in response to the offset;
      modifying a width of the first three-dimensional object in the second axis in response to the offset;
      modifying the initial first profile in the direction along the second axis in response to the offset and a first rate factor to determine the bent first profile; and
      modifying the second profile in the direction along the second axis in response to the offset and a second rate factor to determine the bent second profile, wherein the first rate factor and the second rate factor are different; and
   displaying a representation of the bent first three-dimensional object on the display.

2. The method of claim 1
   wherein a length of the bent first profile compared to a length of the initial first profile are in a first proportion;
   wherein a length of the bent second profile compared to a length of the initial second profile are in a second proportion; and
   wherein the first proportion is greater than the second proportion.

3. The method of claim 1 wherein the first volume and the second volume are related in a manner selected from the group consisting of: greater than, less than, and similar.

4. The method of claim 1 wherein bending the first three-dimensional object further comprises modifying a depth of the first three-dimensional object in the third axis in response to the offset and to a volume preservation factor.

5. The method of claim 4
   wherein modifying the length of the first three-dimensional object along the first axis in response to the offset comprises increasing the length of the first three-dimensional object; and
   wherein modifying the width of the first three-dimensional object in the second axis in response to the offset and to the volume preservation factor comprises decreasing the width of the first three-dimensional object.

6. The method of claim 1
   wherein modifying the initial first profile in the direction along the second axis comprises:
      modifying a first position along the initial first profile in the direction of the second axis by a first amount; and
      modifying a second position along the initial first profile in the direction of the second axis by a second amount; and
      wherein the first amount is greater than the second amount.

7. The method of claim 6 further comprising:
   displaying a representation of a second three-dimensional object on a display, wherein the second three-dimensional object has an associated first axis, a second axis, a third axis, and a third volumes, wherein the second three-dimensional object has an associated initial first profile, and an associated initial second profile;
   bending the second three-dimensional object in the direction along the second axis in response to the offset to form a bent second three-dimensional object, wherein the bent second three-dimensional object is associated with a fourth volume, wherein the bent second three-dimensional object has an associated bent first profile, and an associated bent second profile and wherein bending also includes:
      modifying a length of the second three-dimensional object along the first axis in response to the offset;
      modifying a width of the second three-dimensional object in the second axis in response to the offset and to a volume preservation factor;
      modifying the initial first profile in the direction along the second axis in response to the offset and a third rate factor to determine the bent first profile; and
      modifying the second profile in the direction along the second axis in response to the offset and a fourth rate factor to determine the bent second profile, wherein the third rate factor and the fourth rate factor are different; and
   displaying a representation of the bent second three-dimensional object on the display;
   wherein the control indicator is also associated with the second three-dimensional object.

8. The method of claim 7 further comprising:
   rendering the bent first three-dimensional object and the bent second three-dimensional object to form rendered objects; and
   storing the rendered objects in a frame of animation into a memory.

9. A computer-readable storage media configured to store the frame of animation including the rendered objects determined according to the process described in claim 8.

10. A computer program product stored on a computer-readable tangible media containing executable instructions for execution on a computer system including a processor and a display includes:

code that directs the processor to display a representation of a first object on the display, wherein the first object has an associated first volume;

code that directs the processor to receive an indication of a bend value associated with the first object in a first dimension;

code that directs the processor to determine a first bent object comprising:

code that directs the processor to modify positions along a first-profile associated with the first object in the first dimension in response to the bend value and to a first weighting factor;

code that directs the processor to modify positions along a second profile associated with the first object in the first dimension in response to the bend value and to a second weighting factor, wherein the first weighting factor is different from the second weighting factor; and code that directs the processor to modify a thickness of the first object in response to the bend value; and code that directs the processor to display a representation of the first bent object on the display, wherein the first bent object has an associated second volume.

11. The computer program product of claim 10 wherein the second volume is related to the first volume in a manner selected from the group consisting of: substantially similar, greater than, less than.

12. The computer program product of claim 11 further comprising code that directs the processor to determine a volume preservation factor in response to user input from a device selected from the group consisting of: keyboard, graphical user interface, microphone.

13. The computer program product of claim 12 wherein code that directs the processor to determine a first bent object further comprises code that directs the processor to modify a depth of the first object in response to the bend value and to the volume preservation factor.

14. The computer program product of claim 13 wherein code that directs the processor to modify the thickness of the first object comprises:

code that directs the processor to modify a thickness of the first object at a first location by a first amount in response to the bend value and to the volume preservation factor; and code that directs the processor to modify a thickness of the first object at a second location by a second amount in response to the bend value and to the volume preservation factor;

wherein the first amount and the second amount are different.

15. The computer program product of claim 10
wherein the bend value is also associated with the second object in the first dimension;
wherein the computer program product further comprises:
code that directs the processor to display a representation of a second object on the display, wherein the second object has an associated third volume;
code that directs the processor to determine a volume preservation factor;
code that directs the processor to determine a second bent object comprising:
code that directs the processor to modify a shape of a spline associated with the second object in response to the bend value; and
code that directs the processor to modify a thickness of the second object in response to the bend value and to the volume preservation factor; and code that directs the processor to display a representation of the second bent object on the display, wherein the second bent object has an associated fourth volume.

16. The computer program product of claim 10 wherein
a first position on the first profile is modified by a first amount in the first dimension;
wherein a second position on the second profile is modified by a second amount in the first dimension; and
wherein the first amount is different from the second amount.

17. A graphical user interface for a computer system includes:

a display portion configured to display a representation of a first three-dimensional object, wherein the first three-dimensional object has an associated first volume wherein the first three-dimensional object has an associated initial first profile, and an associated initial second profile; and a control icon associated with the first three-dimensional object, wherein the control icon is configured to allow a user to specify a bend amount to the first three-dimensional object in a first dimension;

wherein the display portion is also configured to display a representation of a bent first three-dimensional object, wherein the bent first three-dimensional object comprises the first three-dimensional object that is bent lengthwise in response to the bend amount, wherein the bent first three-dimensional object has an associated bent first profile, and an associated bent second profile, wherein the initial bent first profile is displaced in the first dimension in response to the bend amount and to a first weighting factor, wherein the initial bent second profile is displaced in the first dimension in response to the bend amount and to a second weighting factor, wherein the first weighting factor and the second weighting factor are different, and that has an adjusted thickness in response to the bend amount and to a volume preservation factor.

18. The graphical user interface of claim 17 further comprising a display portion configured to display the volume preservation factor.

19. The graphical user interface of claim 18
wherein the bend amount is associated with a lengthening of the first three-dimensional object; and
wherein the adjusted thickness is less than an original thickness of the first three-dimensional object.

20. The graphical user interface of claim 18
wherein the bent object has an associated second volume; and
wherein the first volume is related to the second volume in response to the volume preservation factor.

21. The graphical user interface of claim 20 wherein the first volume is approximately equal to the second volume.

22. The graphical user interface of claim 17
wherein the display portion is also configured to display a representation of a second three-dimensional object, wherein the second three-dimensional object has an associated third volume;
wherein the control icon is also associated with the second three-dimensional object, and wherein the bend amount is associated with the second three-dimensional object; and
wherein the display portion is also configured to display a representation of a bent second three-dimensional object, wherein the bent second three-dimensional object comprises the second three-dimensional object that is bent lengthwise in response to the bend amount, and that has an adjusted thickness in response to the bend amount and to the volume preservation factor.

23. The graphical user interface of claim 17
wherein a first position on the first profile is modified by a first amount in the first dimension;
wherein a second position on the first profile is modified by a second amount in the first dimension; and
wherein the first amount is different from the second amount.

* * * * *